May 16, 1933. H. H. SPRAGUE 1,909,730
PRESSURE CONTROL DEVICE FOR GAS REGULATORS
Filed Jan. 26, 1932 2 Sheets-Sheet 1
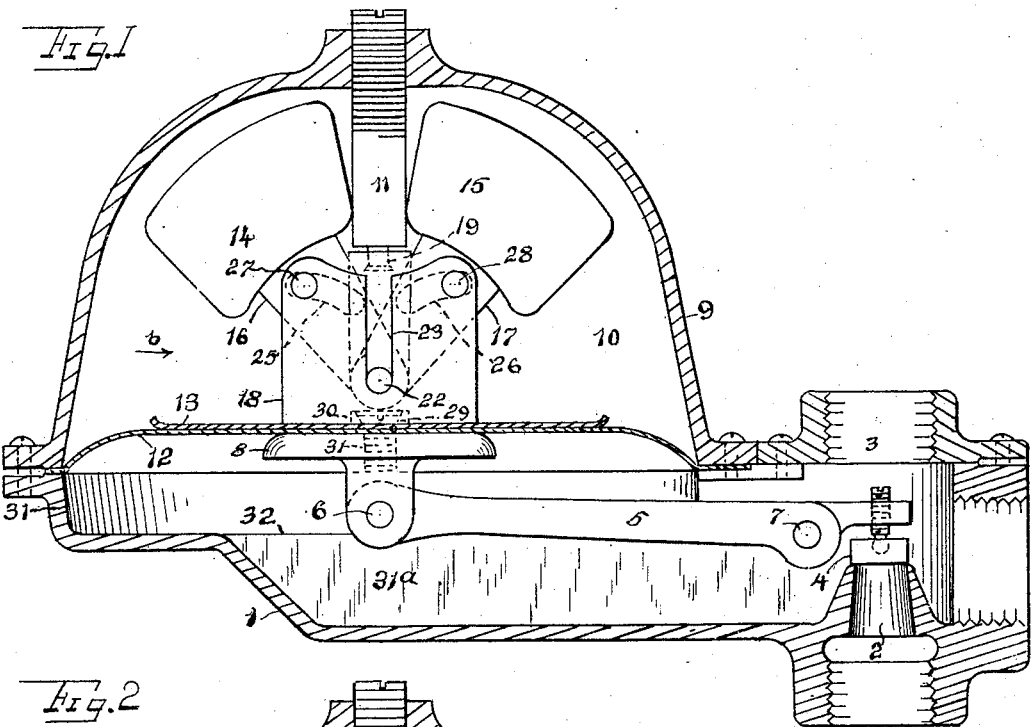
INVENTOR
Henry H. Sprague,
BY
Geo. L. Phillips ATTORNEY May 16, 1933.     H. H. SPRAGUE     1,909,730
PRESSURE CONTROL DEVICE FOR GAS REGULATORS
Filed Jan. 26, 1932     2 Sheets-Sheet 2
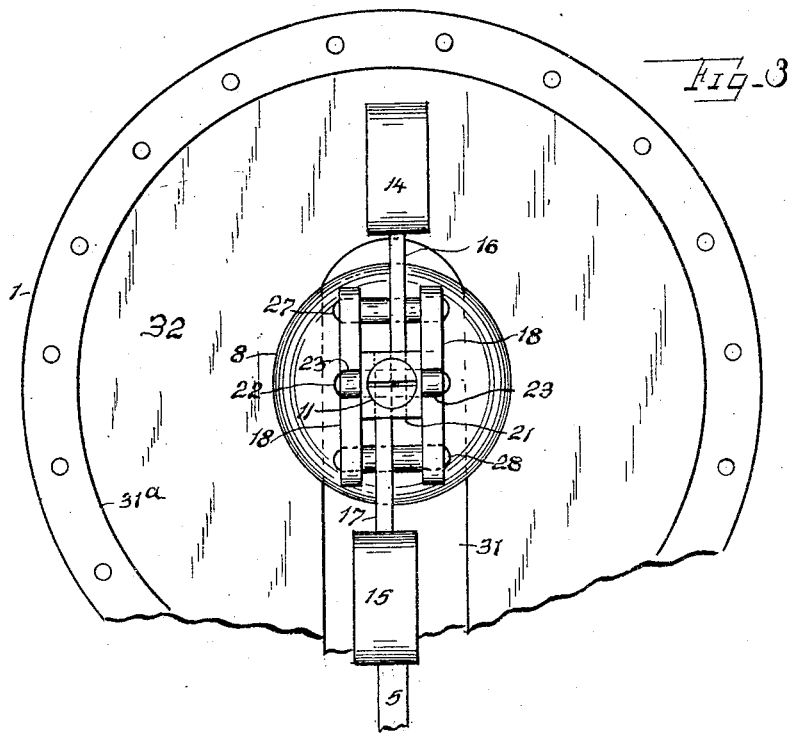
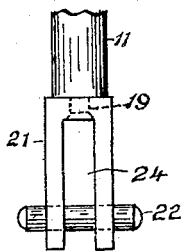
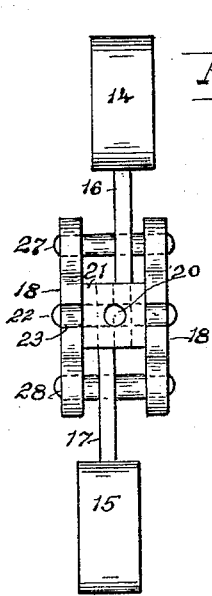
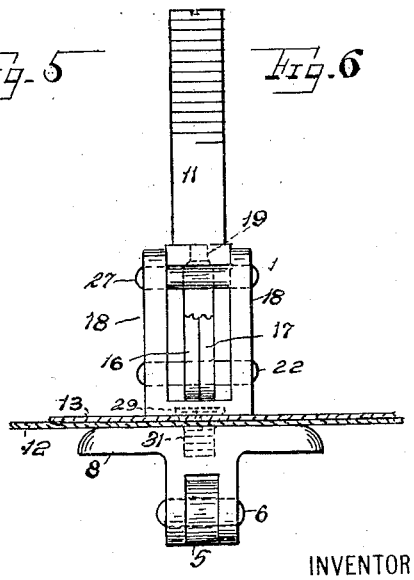
INVENTOR
Henry H. Sprague,
BY
Geo. D. Phillips ATTORNEY Patented May 16, 1933

1,909,730

UNITED STATES PATENT OFFICE

HENRY H. SPRAGUE, OF BRIDGEPORT, CONNECTICUT, ASSIGNOR TO THE SPRAGUE METER COMPANY, OF BRIDGEPORT, CONNECTICUT

PRESSURE CONTROL DEVICE FOR GAS REGULATORS

Application filed January 26, 1932. Serial No. 588,933.

My invention relates to gas regulators, its object being to maintain a constant burner pressure throughout the entire line of burners regardless of the number of burners on the line, or the gas contents of the regulator when operating.

The present invention has the same object and purpose in view as my co-pending application filed August 5, 1931, Number 555,251. In the present case, I employ metal weights whose gravitational force will increase in proportion as the outside demand for gas increases, and the amount of gas pressure in the regulator decreases.

A more full description and operation of my pressure device will be set forth in the following specification and drawings wherein like characters of reference denote corresponding parts in the several views, in which Figure 1 represents a central sectional view of the cover, body, diaphragm, and diaphragm plate of a conventional gas regulator showing the pressure control weights in an elevated position when the regulator valve is closed—

Figure 2 is a similar view of the regulator construction showing the weights in a lowered position with the regulator valve open—

Figure 3 is a broken upper plan view of the body of the regulator with the diaphragm and diaphragm plate omitted, showing the weights in a lowered position looking in the direction of arrow $a$, Figure 1—

Figure 4 is a broken view of the centrally located adjusting screw rotatably mounted on a part of the mechanism connected with the pressure control weights—

Figure 5 is an upper plan view of the lowered weights and mechanism connected therewith with the adjusting screw removed, and Figure 6 is a view of the support in which the pressure control weights are mounted, and broken view of their arms, and a broken sectional view of the diaphragm and diaphragm plate, also a view of the valve lever, valve lever plate and adjusting screw, looking in the direction of arrow $b$ of Figure 1.

The main conventional features of the regulator comprise the body 1, having the gas intake ports 2, outlet port 3, valve 4, valve lever 5 and its fulcrum pins 6 and 7 secured respectively to the body 1, and lever plate 8. The cap 9 has the air chamber 10 in which chamber are located the adjusting screw 11, flexible diaphragm 12, diaphragm plate 13, and the pressure control mechanism presently to be described.

The essential and indispensable features of gas control comprise the weights 14, 15, whose arms 16, 17, are operatively associated with the support 18, as follows:—

The inner end of the adjusting screw 11 carries the pintle 19, Figure 4, adapted to journal in the opening 20 formed in the outer end of the forked member 21, Figure 5. The inner end of this member carries the fixed pin 22 whose projecting ends freely engage with the slots 23 formed in the sides of the support 18, Figures 1, 2, 3 and 5.

The inner end of each arm 16, 17, is journaled on the pin 22 and is operatively located within the open space 24 of the member 21. Curved guide slots 25, 26, formed in said arms, freely embrace respectively the fixed pins 27, 28, projecting through the sides of the support 18. This support simply rests on the diaphragm plate 13, and is maintained against lateral movement by means of the recess 29, located in the bottom thereof, freely embracing the head 30 of the diaphragm and diaphragm plate attaching screw 31.

When the gas intake port is closed, the weights are in the elevated position shown in Figure 1, and are under the influence of gravity while in this position. Instantly the gas pressure begins to fall in the chamber 31$^a$, the weights will descend through a curved path and with a constantly increasing force as the gas pressure falls in said chamber and the outside gas demand increases, and thus maintain a constant burner pressure whether one or all of the burners throughout the entire system are operating.

Through the medium of the curved slots and their contact with the fixed pins in the support 18, both the support and weights will move down in unison until halted when the lever plate 8 rests on the floor 32 and with the gas intake port fully opened. It will be observed that when the weights are thus located, the inner end of the curved slots are still out of contact with the pins, thus permitting a certain amount of reserve movement for the weights, when elevated or lowered.

The incoming gas will deflect the diaphragm, closing the valve and return both weights and their support to the position shown in Figure 1. The pin 22 will always remain in the same relative position with respect to the weights regardless as to where they may be located.

Detail changes pertaining to the means for supporting and guiding the movements of the weights can readily be made to suit the conditions under which they may be called upon to operate. As an indispensable feature of their operation, they must be under the influence of the accelerating force of gravity during their outward movements, and under its accumulative force when halted.

The pressure control device is a complete unit in itself, comprising an adjusting screw, movable weights, and a movable support in which the weights are operatively located, and it is readily adapted for installment in gas regulators of the type described and without the aid of any auxiliary elements for its installment.

Having thus described my invention, what I claim is:—

In a gas regulator of the character described, having gas intake and gas outlet ports, a valve for the intake port, a gas chamber and an air chamber, a flexible diaphragm separating said chambers, and a diaphragm plate, of a pressure control device located in the air chamber comprising an adjusting screw, a member in which the screw is journaled, gravity controlled weights having arms journaled on said member, a support embracing said member and contacting with the diaphragm plate, said support having guiding means therefor associated with said member, means permitting said support and weights to move in unison comprising fixed pins on the support, and said arms having guide slots embracing said pins.

In testimony whereof I affix my signature.

HENRY H. SPRAGUE.